United States Patent
Zilbershtein et al.

(10) Patent No.: US 11,570,192 B2
(45) Date of Patent: Jan. 31, 2023

(54) METHODS, SYSTEMS, AND DEVICES FOR DETECTING OVER-THE-TOP PIRACY

(71) Applicant: Synamedia Limited, Staines Upon Thames (GB)

(72) Inventors: Itai Ephraim Zilbershtein, Hod Hasharon (IL); Assaf Yosef Tamir, Jerusalem (IL); Imri Paran, Jerusalem (IL); Itzchak Bak, Nof Ayalon (IL); Vered Anikster, Jerusalem (IL)

(73) Assignee: Synamedia Limited, Staines Upon (GB)

( * ) Notice: Subject to any disclaimer, the term of this patent is extended or adjusted under 35 U.S.C. 154(b) by 113 days.

(21) Appl. No.: 17/241,016

(22) Filed: Apr. 26, 2021

(65) Prior Publication Data
US 2022/0345474 A1 Oct. 27, 2022

(51) Int. Cl.
*H04L 29/06* (2006.01)
*H04L 9/40* (2022.01)
*G06F 16/23* (2019.01)

(52) U.S. Cl.
CPC ...... *H04L 63/1425* (2013.01); *G06F 16/2379* (2019.01); *H04L 63/10* (2013.01); *H04L 2463/121* (2013.01)

(58) Field of Classification Search
CPC . H04L 63/1425; H04L 63/10; H04L 63/0277; H04L 63/0263; H04L 63/04; G06F 16/2379
USPC .......................................................... 726/23
See application file for complete search history.

(56) References Cited

U.S. PATENT DOCUMENTS

| | | | |
|---|---|---|---|
| 2009/0097659 A1 | 4/2009 | Candelore | |
| 2016/0219089 A1 | 7/2016 | Murthy et al. | |
| 2017/0034763 A1* | 2/2017 | Reddy | H04L 65/1016 |
| 2017/0118179 A1* | 4/2017 | Onno | H04L 63/0478 |
| 2019/0394526 A1* | 12/2019 | Chandrashekar | G06F 11/3476 |

OTHER PUBLICATIONS

Extended European Search Report dated Sep. 29, 2022, European Application No. 22165699.4, pp. 1-9.
Joohee Kim et al., "Analysis of IPTV User Behaviors with MapReduce," 2012 14th International Conference on Advanced Communication Technology (ICACT). IEEE, 2012, pp. 1199-1204.

* cited by examiner

*Primary Examiner* — Longbit Chai
(74) *Attorney, Agent, or Firm* — Fernando & Partners, LLP

(57) ABSTRACT

Techniques for detection over-the-top piracy are described. In some embodiments, a piracy detection method is performed at a server by a piracy detector. The piracy detector obtains records associated with requests for access from a plurality of client devices. The piracy detector further distributes the records to a plurality of nodes according to distribution keys extracted from the records, where each of the plurality of nodes receives a respective set of records associated with a respective distribution key and generates a set of respective watch session records based on the respective set of records. The piracy detector also generates watch session records associated with the distribution keys by aggregating the respective watch session records from the plurality of nodes. The piracy detector additionally identifies one or more pirated client devices among the plurality of client devices based on clusters established from the watch session records.

20 Claims, 9 Drawing Sheets

METHODS, SYSTEMS, AND DEVICES FOR DETECTING OVER-THE-TOP PIRACY

TECHNICAL FIELD

The present disclosure relates generally to anti-piracy and, more specifically, to over-the-top piracy detection.

BACKGROUND

Content delivery networks (CDNs) facilitate fast and reliable content delivery. CDN streaming servers typically cache content on multiple servers that are geographically dispersed. When a user submits a request for a media content item, the CDN streaming server nearest the user's location provides the item, thus accelerating the content delivery and improving the viewing experience. The request from the user often includes a token, which is granted upon authenticating the user and upon which the CDN makes authorization decisions. While serving millions of requests per second, the CDNs record activities in CDN logs, e.g., recording requests, responses, and/or token information. Thus, the CDN logs contain a wealth of information about security. However, due to the enormous amount of data, many previously existing anti-piracy solutions consider using raw CDN logs for piracy detection cost prohibitive. As such, without an efficient way to store and process CDN log data, it is impractical for previously existing piracy detection solutions to utilize CDN logs for over-the-top piracy detection.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
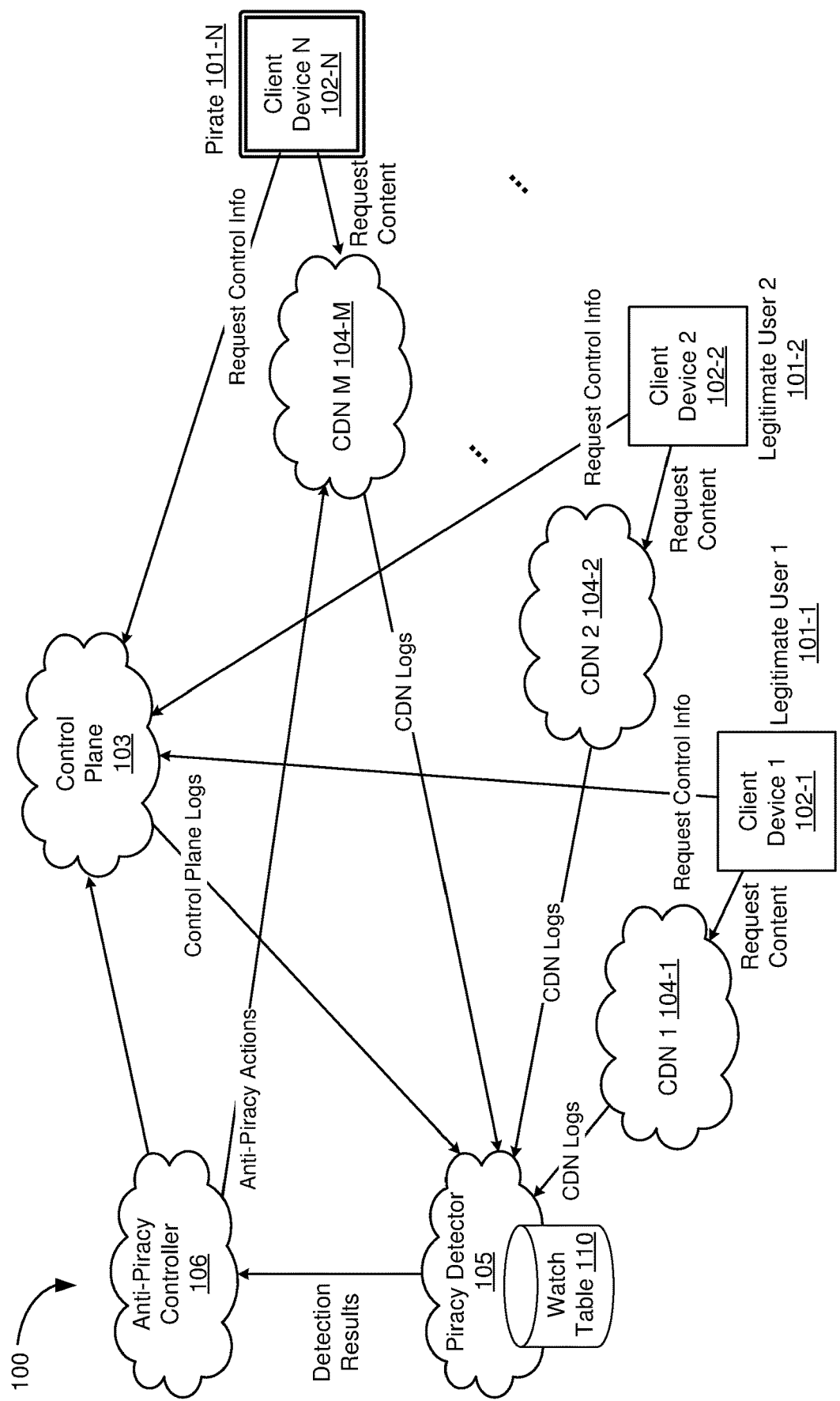
FIG. 1 is a block diagram of an exemplary over-the-top content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, over-the-top (OTT) piracy detection methods, systems, and devices are described herein that solve the aforementioned cost and efficiency issues associated with using content delivery network (CDN) records for OTT piracy detection. A piracy detector described herein reduces the amount of CDN log data by several orders of magnitude. To reduce the amount of CDN log data, the piracy detector extracts fields from each log record and transforms them to derive watch session records associated with OTT devices. In some embodiments, the watch session information is further filtered to reduce the number of records, thus reducing the amount of processing as well as the amount of data for storage. In some embodiments, the piracy detector utilizes a real-time event processing framework to distribute the task of generating watch session records to multiple processing nodes, where the multiple processing nodes work in parallel to process the data efficiently in memory. In some embodiments, control plane logs, which reflect authentication information, are similarly processed and joined with the watch session records to improve the accuracy and effectiveness of OTT piracy detection.

Having obtained the reduced watch session records, e.g., by aggregating from the multiple processing nodes, in some embodiments, the piracy detector uses clustering to identify piracy behaviors that are statistically different from normal usage, e.g., identifying anomalies and distinct attack patterns associated with identity cloning, token sharing, framing an innocent or a fictitious user, and/or exploiting naïve token usage counting. Thus, by narrowing down the amount of data in a real-time event processing framework, the piracy detection methods, systems, and devices described herein generate a substrate for efficiently and effectively detecting OTT piracy, thus lowering storage and processing cost associated with using CDN logs for OTT piracy detection and making real-time OTT piracy detection based on CDN logs practical.

In accordance with various embodiments, a piracy detection method is performed at a device (e.g., a server) with one or more processors and a non-transitory memory. The piracy detection method includes obtaining records associated with requests for access from a plurality of client devices. The piracy detection method further includes distributing the records to a plurality of nodes according to distribution keys extracted from the records, where each of the plurality of nodes receives a respective set of records associated with a respective distribution key and generates a set of respective watch session records based on the respective set of records. The piracy detection method also includes generating watch session records associated with the distribution keys by aggregating the respective watch session records from the plurality of nodes. The piracy detection method additionally includes identifying one or more pirated client devices among the plurality of client devices based on clusters established from the watch session records.

Example Embodiments

Web security systems, including content distribution systems (e.g., content distribution networks (CDNs)) are grappling with the problem of assuring that access to content and/or services is provided to authenticated and authorized clients. The problem is complicated by the separation between a client authentication sub-system—to ascertain that the user at the client device is who they claim to be, and a client authorization sub-system—to allow a client device to access a particular piece of information provided by a server. The separation between authentication and authorization is necessary for various reasons.

First, business entities providing subscription services to users are typically responsible for authentication, e.g., managing user accounts. The CDNs that cache media content requested by the users and provide the requested content are typically run by a separate business entity from the business entities that provide subscription services. In other words, while one in the business of selling subscription is responsible for authentication and authorizing the authenticated subscribers, a different business is responsible for providing resources based on the authorization, e.g., providing the service for which a subscription is bought based on the authorization provided by the subscription seller.

Second, authentication typically involves a human user providing something they know, e.g., a password or a one-time code provided out-of-band. People find frequent authentication burdensome. As such, systems are often designed to perform authentications as few times as possible to avoid user annoyance that may drive users away. On the other hand, systems typically perform authorization whenever a file or service is requested to protect against unauthorized access to the requested content. As such, it is necessary to perform authorization frequently, e.g., for every file retrieval request.

Many systems, which have separate authentication and authorizations sub-systems, use tokens (also referred to hereinafter as "authorization tokens" or "access tokens") to carry information from the authentication stage to the resource access stage, where an authorization token is presented to access resources. Such systems often use the tokens to eliminate direct communications between sub-systems that belong to separate business entities. Upon authenticating a user, a signed token is issued by the authentication sub-system. When a user requests content, the signed token is sent along with the request as proof of identity. The authorization sub-system verifies the signed token and responds to the request upon determining that the signed token is authentic. While the authorization sub-system has the means to validate a presented token, it has no means to directly authenticate the user. As such, the authorization sub-system cannot verify that the token being presented has really been granted to the client, and the tokens cannot be relied upon for piracy detection.

Over-the-top (OTT) streaming is an example of a system, where authentication of a user using a client device is carried out by one sub-system, referred to hereinafter as "the control plane", and the resource service is performed in another sub-system, e.g., a CDN. The authentication and authorization sub-systems in OTT streaming are thus precursors to getting an authorization token provided to the subscriber for access to resources (e.g., media content and/or services). FIG. 1 is a block diagram of an exemplary OTT content delivery system 100 capable of real-time piracy detection, in accordance with some embodiments. In some embodiments, the OTT content delivery system 100 includes a control plane 103 and a plurality of CDNs 104, e.g., CDN 1 104-1, CDN 2 104-2, . . . , CDN 104-M, etc. The CDNs 104 (e.g., geographically dispersed servers) facilitate streaming media content and/or delivering services to a plurality of client devices 102 used by a plurality of users 101, e.g., client device 1 102-1 used by a user 101-1, client device 2 102-2 used by a user 101-2, . . . , client device N 102-N used by a user 101-N, etc. The media content (also referred to hereinafter as "multimedia content", "media content item(s)", or "content") can include any multimedia data, such as visual data, audio data, text, data files, web pages, games, etc. that can be consumed by the client devices 102.

Upon receiving a request for control information from a respective client device 102, the control plane 103 (e.g., on a server remote and distinct from the client devices 102) authenticates the corresponding end user 101. Upon successful authentication, the control plane 103 provides the end user 101 with control information. In some embodiments, the control information includes media manifest URLs, identity information, and/or authorization tokens to present to the CDNs 104. In some embodiments, a token includes identity information and authorization of the user as known to the control plane 103, e.g., authorizing access to certain subscribed media content and/or services. It should be noted that using tokens is one example of carrying the control information for authorization in the exemplary system 100. Other implementations of passing control information for authorization can be used in place of or in conjunction with the tokens, and that the anti-piracy methods, systems, and devices described herein are compatible with any of such implementations.

When the client devices 102 request media content and/or services, the client devices 102 present the tokens to the CDNs. Upon receiving the requests, the CDNs 104 authorize the users 101 based on the information in the tokens and send the content (e.g., media manifests, video segments, audio segments, and/or subtitles) to the client devices 102 for consumption. Also, the CDNs 104 record information associated with the requests and the tokens in CDN logs. As such, each line of the CDN logs includes a log message recorded in response to an access request from a client in accordance with some embodiments.

Among the users 101, some are legitimate subscribers, e.g., legitimate users 101-1 and 101-2. Also, among the users 101, the user 101-N may be a pirate using the client device 102-N to acquire and distribute content illegally. For example, the user 101-N may make a copy of an authorization token provided to the legitimate user 101-2 and use the copied authorization token to access content from the client device 102-N. The content delivery system 100 described herein thus detects piracy activities, where authorization tokens for legitimate subscribers are abused, e.g., copied and used by non-authorized users. As such, different from previously existing piracy detection systems and methods that detect illegal piracy activities such as acquiring the content and re-distributing the content, the piracy detection method described herein detects piracy activities when the pirate 101-N attempts to use the service provider's system (e.g., the CDNs 104) for content distribution by distributing copies of access tokens. Though FIG. 1 illustrates one pirate 101-N using one client device 102-N for piracy activities, one or more pirates 101-N may use multiple client devices 102 for piracy activities and the multiple client devices 102 may connect to the same or different CDNs 104.

To detect piracy, a piracy detector 105 obtains the CDN logs from the authorization sub-system (i.e., the CDNs 104). Further, in some embodiments, the piracy detector 105 obtains the control plane logs from the authentication sub-system (i.e., the control plane 103) when the control plane logs are available. The piracy detector 105 then reduces the data from the logs to a condensed intermediate data structure—a watch table 110.

The watch table 110 in accordance with some embodiments is an intermediate data structure for storing data generated by the piracy detector 105 and it significantly reduces the volume of data for piracy detection. In some embodiments, record(s) in the watch table 110 represent patterns of a particular client accessing a particular media asset within a time unit. In some embodiments, the watch table 110 is enhanced with metadata from the control plane logs. It should be noted that the watch table 110 is one embodiment of an intermediate data structure for storing data generated by the piracy detector 105, any other forms of intermediate data structures for storing the condensed data can be used in place of or in conjunction with the watch table 110.

In some embodiments, the piracy detector 105 analyzes the data stored in the watch table 110 and identifies attacks by looking for anomalies and distinct attack patterns. Based on the analysis, the piracy detector 105 determines whether or not a respective user 101 is a pirate, e.g., determining that the user 101-N is a pirate and the users 101-1 and 101-2 are legitimate subscribers. In some embodiments, the piracy detector 105 further communicates the detection results to an anti-piracy controller 106. Upon receiving the detection results, the anti-piracy controller 106 instructs the control plane 103 and/or the CDNs 104 to perform further anti-piracy actions, e.g., disrupting services and/or streaming to client device N 102-N via CDN M 104-M.

The OTT content delivery system 100 is capable of using the logs (e.g., the CDN logs and the control plane logs when available) to detect OTT piracy with efficiency. The piracy detector 105 can reduce the amount of log data by several orders of magnitude and store the condensed data in the watch table 110. The watch table 110 includes domain-specific knowledge of watch session data, which provides a good substrate for detecting OTT piracy. The anti-piracy solution described herein is not dependent on the integration of the authentication sub-system (e.g., the control plane 103) and the authorization sub-system (e.g., the CDNs 104). The piracy detector 105 can use the information from the CDNs 104 alone for OTT piracy detection. If the information from both sources 103 and 104 are available, the piracy detector 105 can cross validate the information to improve the accuracy and efficacy of the identification of anomalies and distinct attack patterns.

It should be noted that the OTT streaming system 100 can include more, less, and/or different elements than shown in FIG. 1. As will be described in further detail below, each of the elements in the OTT streaming system 100 can include more, less, and/or different sub-elements than shown in FIG. 1. Additionally, each of the elements in the OTT streaming system 100 can include appropriate hardware, software, firmware, and/or virtual machines to perform the operations attributed to the element herein. Operation(s) attributed to an element in the OTT streaming system 100 herein should not be considered binding and in some embodiments, other element(s) in the exemplary system 100 may additionally or alternatively perform such operation(s). For example, though the watch table 110 is shown as part of the piracy detector 105, the watch table can be on a separate device and/or node on the server and/or the cloud. In another example, though the anti-piracy controller 106 is shown as separate from the piracy detector 105, the anti-piracy controller 106 can reside on the same device and/or perform the operations using the same hardware, software, firmware, and/or virtual machine as the piracy detector 105.

Further, it should be noted that though FIG. 1 illustrates a control plane 103, a single piracy detector 105, and a single anti-piracy controller 106, the system 100 may include one or more control planes 103, one or more piracy detectors 105, and/or one or more anti-piracy controllers 106. Likewise, the system 100 may include one or more data structures for storing data in the watch table 110 (e.g., distributed). For the sake of simplicity, the subject matter will be described hereinafter for the most part with reference to a single control plane 103, a single piracy detector 105, a single anti-piracy controller 106, and a single watch table 110. Thus, references herein to the control plane 103, the piracy detector 105, the anti-piracy controller 106, and the watch table 110 in the single form cover embodiments where there is a single control plane 103, piracy detector 105, anti-piracy controller 106, and watch table 110 as well as embodiments where there is a plurality of control planes 103, piracy detectors 105, anti-piracy controllers 106, and watch tables 110.

Figure 2:
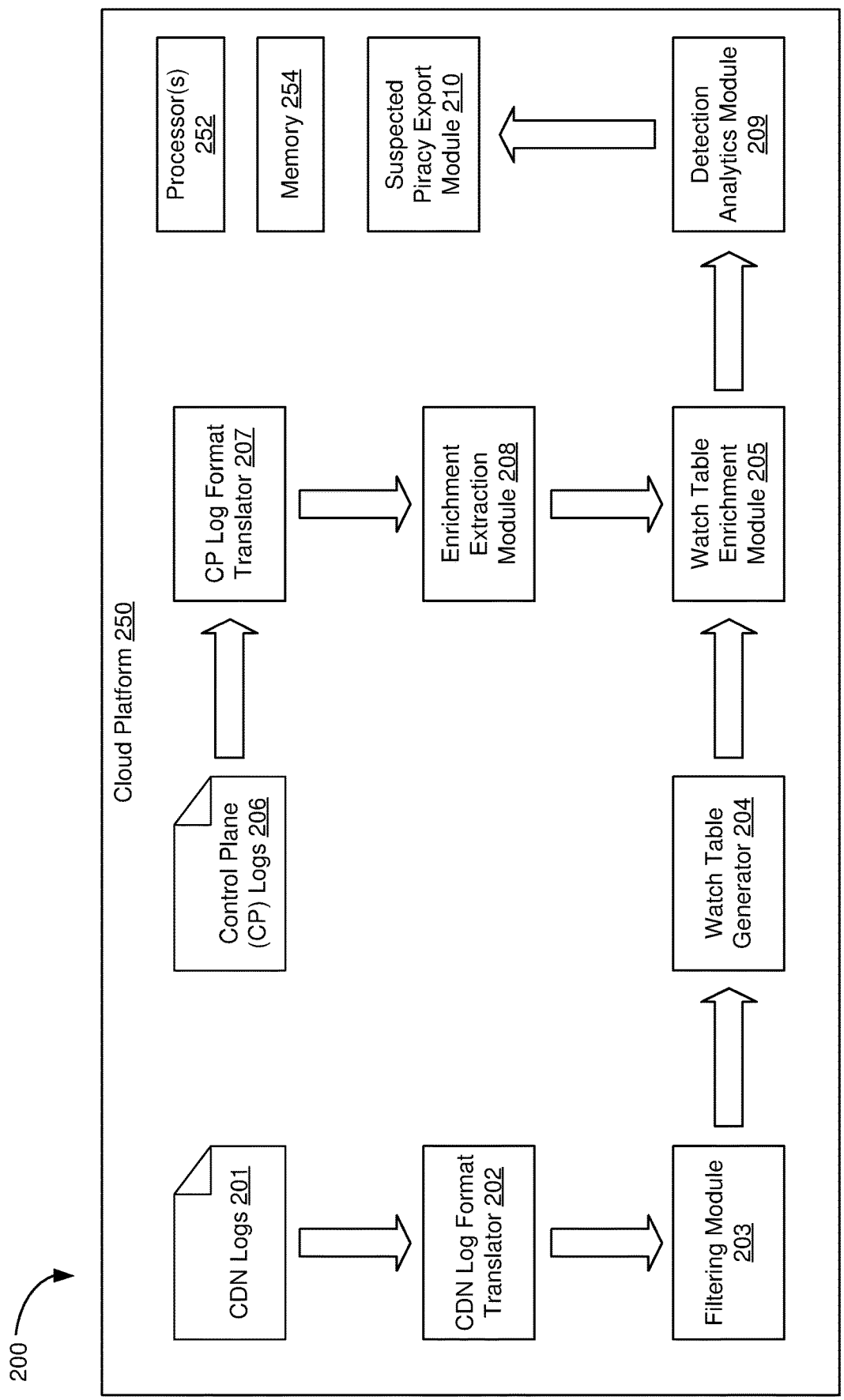
FIG. 2 is a flow diagram illustrating a piracy detection pipeline, in accordance with some embodiments.

FIG. 2 is a flow diagram illustrating a piracy detection pipeline 200 in accordance with some embodiments. In some embodiments, the piracy detection pipeline 200 is performed on a cloud platform 250, which includes one or more processor(s) 252 and non-transitory memory 254. In some embodiments, the cloud platform 250 provides functions of the piracy detector 105 as described above with reference to FIG. 1. As such, each element in the pipeline 200 can be implemented by the appropriate hardware (e.g., the one or more processor(s) 252 and the non-transitory memory 254), software being executed by the hardware, firmware, and/or virtual machines running on top of the hardware to perform the operations attributed to the element herein. Operation(s) attributed to an element in the pipeline 200 herein should not be considered binding and in some embodiments, other elements may additionally or alternatively perform such operation(s).

In some embodiments, the piracy detector (e.g., the piracy detector 105, FIG. 1) on the cloud platform 250 implements the pipeline 200, in which logs are ingested, processed, and analyzed, and the results are produced. As such, in some embodiments, the piracy detector includes a CDN log format translator 202, a filtering module 203, a watch table generator 204, a watch table enrichment module 205, an enrichment extraction module 208, a control plane log format translator 207, a detection analytics module 209, and a suspected piracy export module 210. In some embodiments, the piracy detector receives CDN logs 201 from the CDNs (e.g., the CDNs 104). The CDN logs 201 are typically text files covering a period of time, where each row is a log record for an access request (e.g., an HTTP access request) serviced by the CDNs. The CDN log format translator 202 translates the received text files (e.g., received from one or more geographically dispersed CDNs 104, FIG. 1) into a common format for the rest of the pipeline 200. In some embodiments, the filtering module 203 applies one or more filters to remove access requests that are not used by the rest of the pipeline 200. In some embodiments, the filtering module 203 employs filters that consider specific properties of suspicious flows, e.g., specific channels and user agents, etc., to narrow down the amount of data for analysis.

In some embodiments, the CDNs transport the CDN logs 201 as files to the piracy detector over asynchronous channels (e.g., out-of-band, using message queuing service, etc.) in response to the request from the piracy detector. Upon receiving the CDN logs 201, the piracy detector derives properties from the CDN logs 201. Some properties, such as the timestamp, HTTP method used by the request, the client IP, the client user agent (e.g., a web browser), can be directly obtained from the CDN logs 201. Other properties can be derived from the request URLs in the CDN logs 201, such as whether the requested content is linear or video-on-demand, a channel identifier or an asset identifier, a token identifier that may be present in the URL request associated with the session token and/or watermark token, etc., the file type (e.g., video, audio, manifest, and/or subtitles, etc.), the presentation parameters (e.g., bitrate and/or resolution, etc.). Having obtained the properties from the CDN logs 201, the filtering module 203 applies one or more filters to the properties to reduce the amount of data, e.g., a filter specifying including GET requests for video segments of linear video of specific assets and excluding certain client user agents. In some embodiments, the watch table generator 204 then generates the basic data structure based on the condensed data and stores the data structure in the watch table (e.g., the watch table 110, FIG. 1).

In some embodiments, when control plane logs 206 are available from the control plane (e.g., the control plane 103, FIG. 1), the piracy detector obtains the control plane logs 206, e.g., over an asynchronous channel. Like the CDN logs 201, the control plane logs 206 are typically text files that cover a period of time, where each row in the file is a log record for a particular control plane action taken on behalf of a subscriber. In some embodiments, the control plane log format translator 207 converts the logs to a common format used by the pipeline 200. The enrichment extraction module 208 then extracts the control plane information, and the watch table enrichment module 205 enriches the watch table with the extracted control plane information, e.g., using a join operation.

In some embodiments, the detection analytics module 209 analyzes the watch table and generates the detection results. For example, the detection analytics module 209 may report that the user 101-N using client device N 102-N in FIG. 1 is a pirate. In some embodiments, the suspected piracy export module 210 exports the detection results to the anti-piracy manager 106 (FIG. 1).

Figure 3:
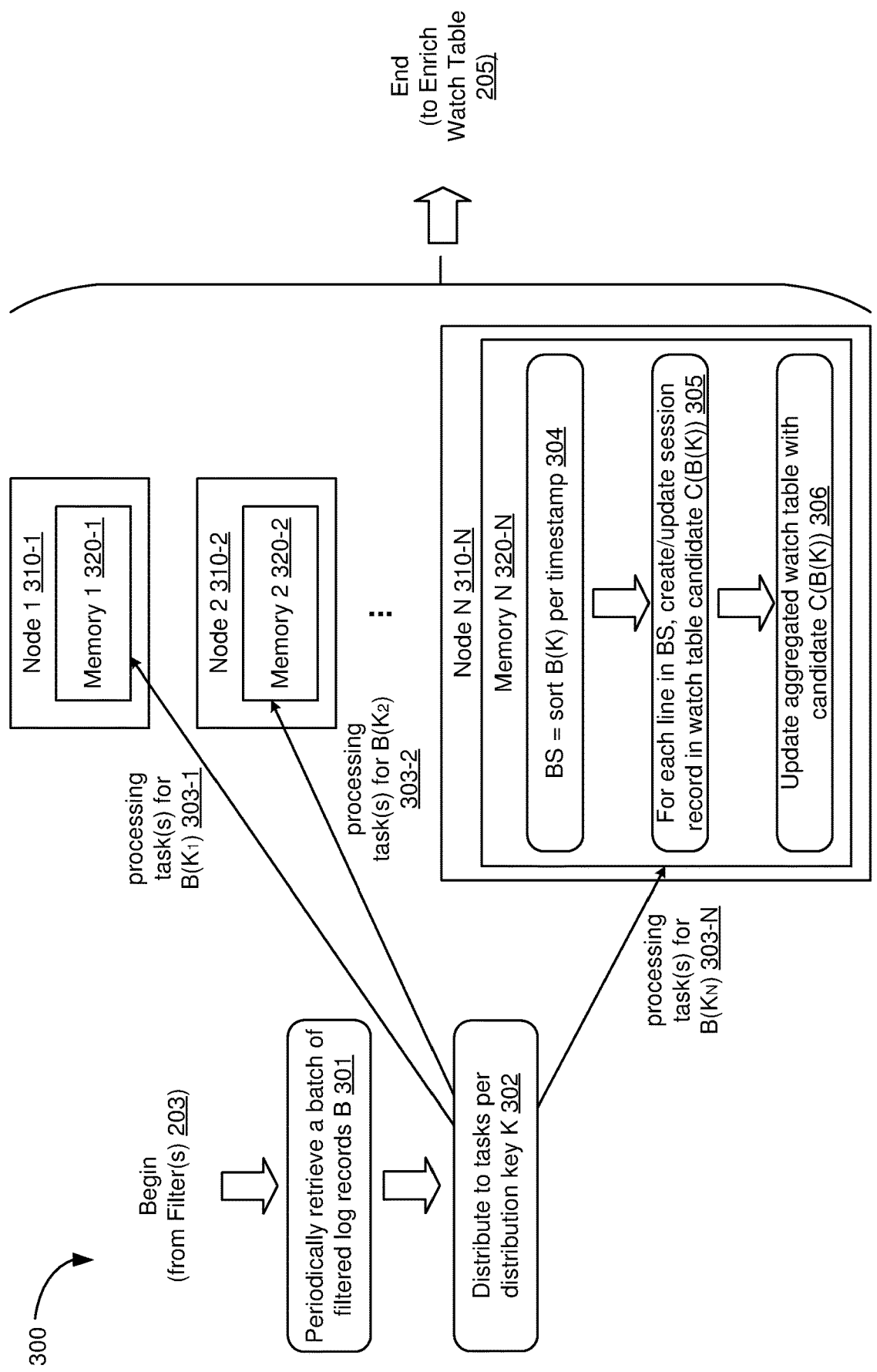
FIG. 3 is a diagram illustrating a watch table generation process, in accordance with some embodiments.

FIG. 3 is a diagram illustrating a process 300 of generating the watch table 110 (FIG. 1) in accordance with some embodiments. In some embodiments, the watch table 110 is generated by the watch table generator 204 (FIG. 2) of the piracy detector 105 (FIG. 1) on the cloud platform 250 (FIG. 2). In some embodiments, the watch table is generated on-the-fly using techniques supported by real-time event processing framework. By way of example, the techniques supported by real-time event processing framework may include map-reduce techniques supported by a Spark streaming framework, although other computational processing techniques and frameworks may be used in various implementations.

In some embodiments, when using map-reduce techniques, data are distributed to processing nodes (also known as workers) based on a distribution key. The processing nodes work in parallel, each receiving and working on the part of the data associated with the distribution key. The results from the processing nodes are then aggregated. Working in this fashion, it is possible to size the processing nodes so that the entire computation until the final reduction phase takes place in memory, thus expediting fast event processing and enabling real-time piracy detection. In FIG. 3, the watch table generator includes a plurality of nodes 310, e.g., node 1 310-1, node 2 310-2, . . . , node N 310-N, etc. Each of the plurality of nodes 310 includes a non-transitory memory 320, e.g., memory 1 320-1 in node 1 310-1, memory 2 320-2 in node 2 310-2, . . . , memory N 320-N in node N 310-N, etc. The memory 320 can be sized so that the computation of the distributed task(s) takes place in the non-transitory memory 320 for real-time event processing.

It should be noted that each of the plurality of nodes 310 can include appropriate hardware, software, firmware, and/or virtual machines to perform the operations attributed to the element herein. For example, the plurality of nodes 310 can be on different devices, at different locations, or co-located on one or more devices but configured as different instances, e.g., as virtualized instances in the cloud platform 250 (FIG. 2) running on top of the processor(s) 252 (FIG. 2) of one or more servers. The virtualization is not limited to any particular implementation, e.g., multiple virtual machines, multitenancy, and/or containerization. Likewise, the non-transitory memory 320 can be on different devices, at different locations, co-located, and/or shared.

In some embodiments, the process 300 begins with the watch table generator obtaining filtered log records from the filter(s) 203 (FIG. 2). In step 301, the watch table generator periodically retrieves a batch of filtered log records from the filter(s) 203, where the batch of filtered log records is denoted as B. In step 302, the watch table generator distributes B to a plurality of processing tasks 303 based on a distribution key K, e.g., distributing processing task(s) for a distribution key $K_1$, denoted as $B(K_1)$ 303-1, to node 1 310-1 to be executed in memory 1 320-1, distributing processing task(s) $B(K_2)$ to node 2 310-2 to be executed in memory 2 320-2, . . . , distributing processing task(s) $B(K_N)$ to node N 310-N to be executed in memory N 320-N, etc. In some embodiments, multiple processing tasks 303 can map to a single execution context and/or thread for improved efficiency.

Each of the processing task(s) $B(K_i)$ 303 receives a subset of records in the batch of filtered log records associated with the distribution key $K_i$. In some embodiments, the distribution key includes a client identifier, such as a user ID that uniquely identifies a user using a client device to assess the media content and/or services. In some other embodiments, the distribution key includes the combination of client device IP address and the user agent string (e.g., representing the web browser from which a request for access was initiated) that identifies a profile, e.g., a user, a device, a user using a browser, etc. Other information can be included in the distribution key as well in accordance with various embodiments, such as the asset ID (e.g., channel ID). For example, a distribution key can correspond to a user who has one OTT device in the house for assessing subscribed media content. As such, the user ID as the distribution key represents the user using the OTT device to assess the subscribed media content. In another example, a composite distribution key can correspond to a user using one of their OTT devices for assessing one of their subscribed channels, e.g., a composite distribution key comprising the OTT device IP, the user agent string, and the channel ID.

In some embodiments, as shown in FIG. 3, at a respective node 310, processing task(s) 303 for a respective distribution key K include, in step 304, sorting B(K) based on the timestamps, e.g., in ascending order, and generating sorted log records, denoted as BS. In step 305, the watch table generator processes each line in the sorted log records, and creates or updates watch session records (also referred to hereinafter as the "session records") in the watch table, e.g., by generating watch table candidate records, denoted as C(B(K)). Sub-steps in step 305 are further illustrated in FIGS. 4 and 5A-5D. In step 306, a respective node 310 updates the watch table. As such, records from the plurality of nodes 310 are aggregated in the watch table and the records are updated according to the candidate records C(B(K)). The process 300 ends with the watch table generator notifying the watch table enrichment module 205 to enrich the watch table.

Figure 4:
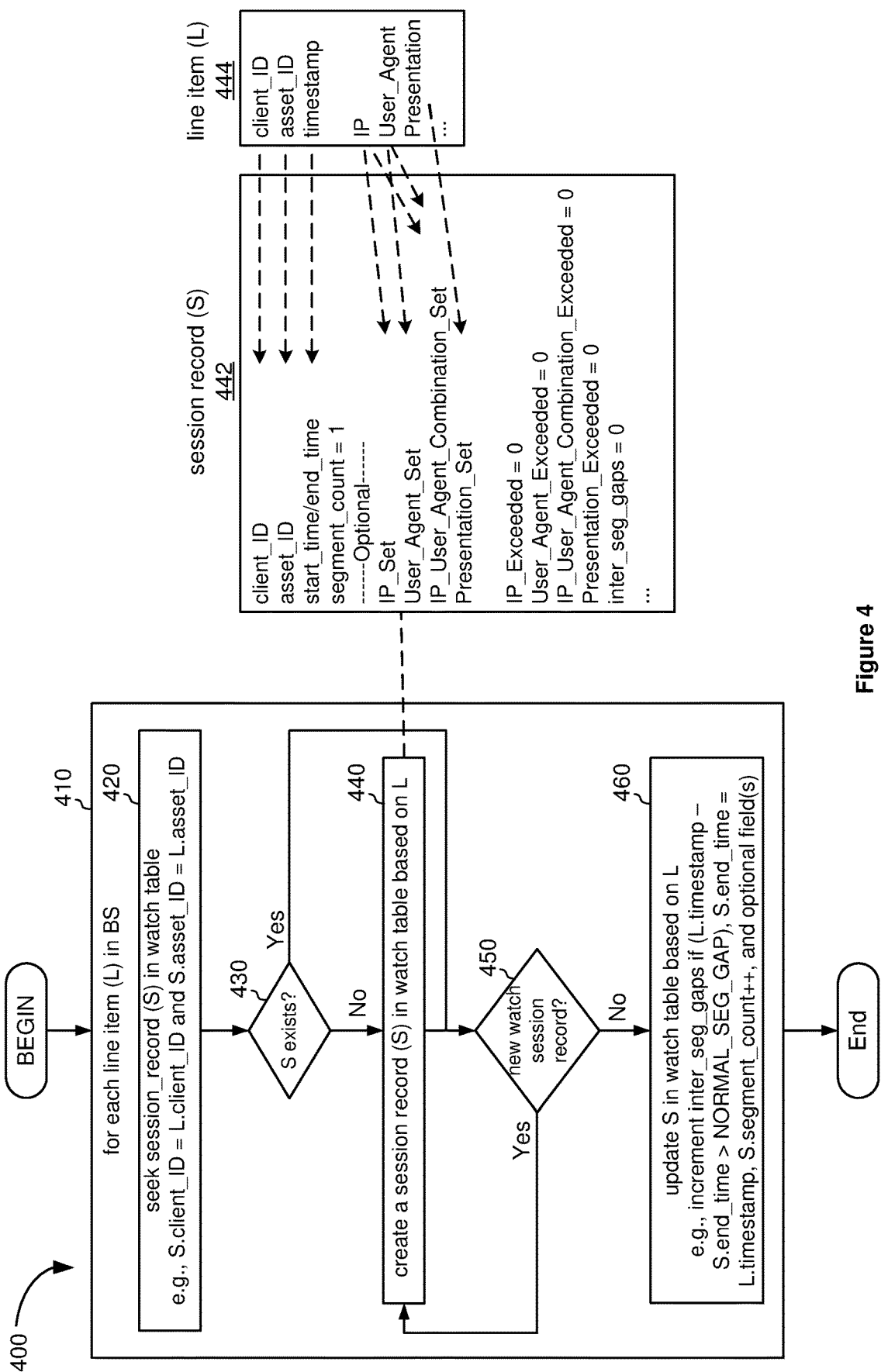
FIG. 4 is a flowchart illustrating a method of creating and/or updating session records in the watch table, in accordance with some embodiments.

FIG. 4 is a flowchart illustrating a method 400 of creating and/or updating session records in the watch table, in accordance with some embodiments. In some embodiments, the method 400 corresponds to step 305 in FIG. 3 performed by a respective node 310 (FIG. 3) of the watch table generator 204 (FIG. 2). The method 400 begins with the node processing each line of the sorted log records BS as represented by block 410. For each line item (denoted as L) in BS, the node seeks a session record (denoted as S) in the watch table, as represented by block 420. For example, when seeking the session record in the watch table, the node locates the session record using the distribution key, such as the client ID (denoted as client_ID) and/or the asset ID (denoted as asset_ID).

In some embodiments, as represented by a decision block 430, the node determines whether the session record exists in the watch table, e.g., whether or not a session record S with S.client_ID=L.client_ID and S.asset_ID=L.asset_ID exists in the watch table. Upon determining that the session record does not exist in the watch table ("No"-branch from the decision block 430), the node creates a session record in the watch table based on the line item in the sorted filtered log record. An exemplary session record 442 and an exemplary line item 444 are shown in FIG. 4.

As shown by the dashed arrows, when creating the session record 442, the node sets the fields in the session record 442 according to the corresponding fields in the line item 444. For example, the node sets the client ID of the session record 442 according to the client ID from the line item 444, sets the asset ID of the session record 442 according to the asset ID from the line item 444, and sets both the start time (denoted as start_time) and the end time (denoted as end_time) of the session record 442 according to the timestamp in the line item 444. In some embodiments, when creating the session record 442, the node sets a segment count (denoted as segment_count) to 1 and increments the segment count when updating the session record according to another line item 444.

In some embodiments, when creating the session record 442 in the watch table, the node also optionally sets one or more of the fields in the session record 442 according to the line item 444, such as the IP set (denoted as IP_Set), the start and end time of the session (denoted as start_time and end_time), the user agent set (denoted as User_Agent_Set), the IP and user agent combination set (denoted as IP_User_Agent_Combination_Set), and the presentation set (denoted as Presentation_Set) (e.g., each presentation setting in the presentation set represents bitrate and/or resolution, etc.), etc. In some embodiments, the node also initializes counters when creating the session record 442, such as setting an IP exceeded counter (denoted as IP_Exceeded) that reflects the number of IP addresses associated with the watch session, setting a user agent exceeded counter (denoted as User_Agent_Exceeded) that records the number of user agents for accessing the watch session, setting an IP and user agent combination exceeded counter (denoted as IP_User_Agent_Combination_Exceeded) that represents the number of different combinations of IP addresses and user agents for accessing the watch session, setting a presentation changes exceeded counter (denoted as Presentation_Exceeded) that records the number of different presentation settings for the watch session, and/or setting an inter segment gaps counter (denoted as inter_seg_gaps) that records the number of abnormal inter segment gaps, etc.

Still referring to the method 400, in some embodiments, upon determining that the session record exists in the watch table ("Yes"-branch from the decision block 430), the node determines whether the line item corresponds to a new watch session record. As represented by block 450, in some embodiments, the node determines whether to create a new session record in the watch table based on the timestamp in the line item and the end time of the existing session record, e.g., by examining whether the timestamp in the line item exceeds a threshold from the end time in the existing session record. In the case of the timestamp in the line item minus the end time in the session record greater than a watch session end time gap ("Yes"-branch from the decision block 450), the node creates a new session record in the watch table based on the line item, as represented by block 440. In other words, a bigger than a threshold gap between the line item timestamp and the end time in the session record, e.g., L.timestamp−S.end_time>WATCH_END_TIME_GAP, indicates that the line item represents a new watch session record. On the other hand, in the case of the timestamp in the line item minus the end time in the session record not greater than a watch session end time gap ("No"-branch from the decision block 450), the node updates the session record in the watch table based on the line item, as represented by block 460.

Further as represented by block 460, in some embodiments, when updating the session record, in some embodiments, the node increments the inter segment gaps counter (denoted as inter_seg_gaps) when a wide inter segment gap is detected (e.g., when L.timestamp−S.end_time>NORMAL_SEG_GAP), updates the end time field of the session record in the watch table with the timestamp value from the line item, and increments the segment count to indicate more segments are requested and/or consumed in the same watch session. In some embodiments, the node also updates other fields of the session record in the watch table in accordance with some embodiments, as will be described below with reference to FIGS. 5A-5D.

FIGS. 5A-5D are flowcharts 500A-500D illustrating various updates to the session record in accordance with some embodiments. While certain specific updates to the session record are illustrated, those skilled in the art will appreciate from the present disclosure that various other updates have not been illustrated for the sake of brevity, and so as not to obscure more pertinent aspects of the embodiments disclosed herein. As such, FIGS. 5A-5D merely show some example aspects of the session record updates and are therefore not to be considered limiting.

Figures 5A, 5B:
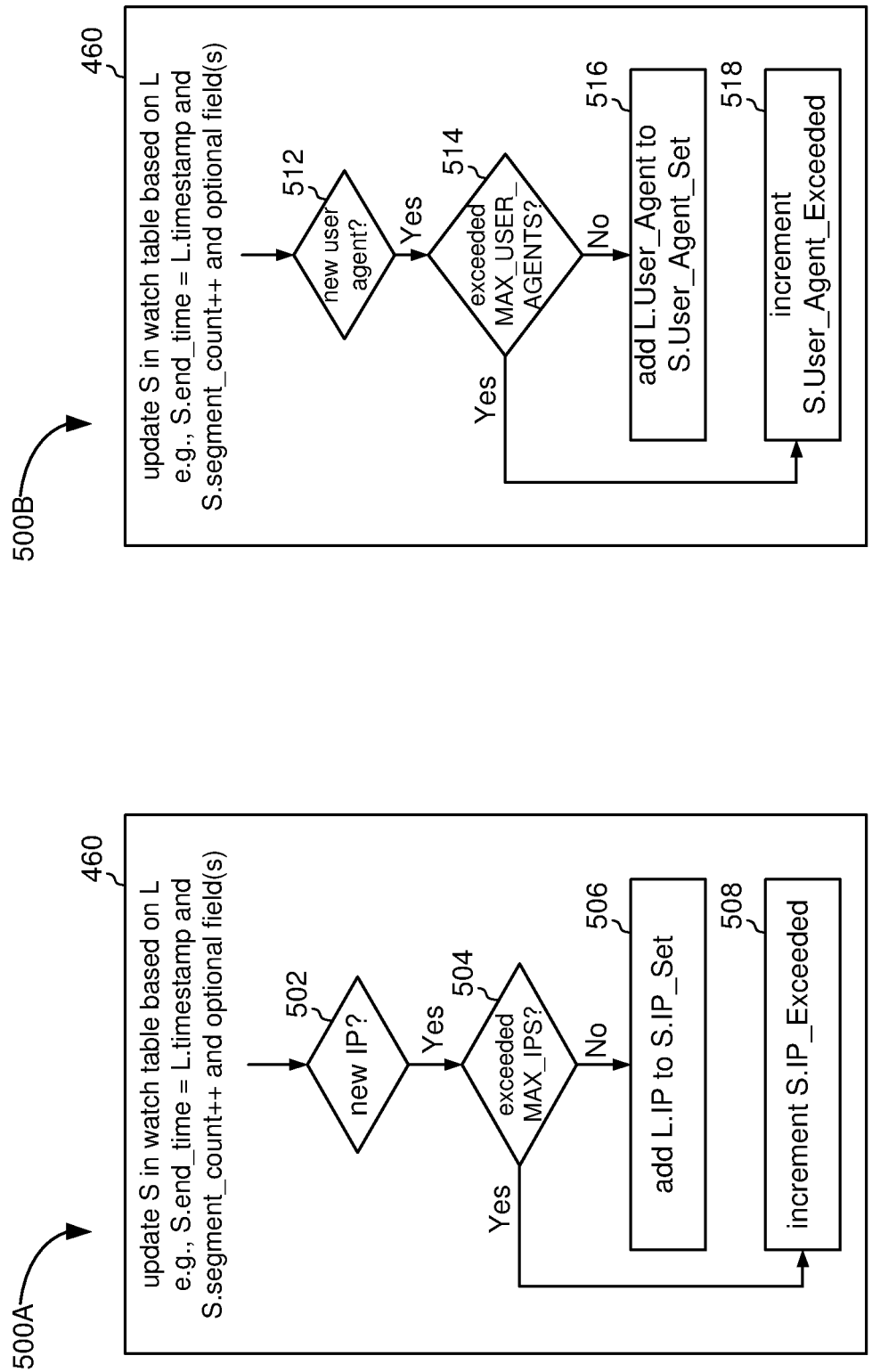
FIGS. 5A-5D are flowcharts illustrating various session record updates, in accordance with some embodiments.

In FIG. 5A, a session record update begins with the node determining whether the IP address in the line item is a new IP address, e.g., by determining whether the IP address in the line item is in the IP set of the existing session record, as represented by block 502. In some embodiments, in the case of the IP address in the line item being a new IP address ("Yes"—branch from the decision block 502), e.g., L.IP not in S.IP_Set, the node further determines whether the number of IP addresses in the IP set of the session record has exceeded the maximum number of IP addresses, e.g., whether size_of (S.IP_Set)<=MAX_IPS, as represented by block 504. In some embodiments, in the case of the number of IP addresses in the IP set of the session record not exceeding the maximum number of IP addresses ("No"-branch from the decision block 504), the node adds the IP address from the line item to the IP set field of the session record, as represented by block 506. On the other hand, in the case of the number of IP addresses in the IP set of the session record exceeding the maximum number of IP addresses ("Yes"-branch from the decision block 504), the node increments the IP_Exceeded counter, as represented by block 508.

In FIG. 5B, a session record update begins with the node determining whether the user agent string in the line item is a new user agent, e.g., by determining whether the user agent in the line item is in the user agent set of the existing session record, as represented by block 512. In some embodiments, in the case of the user agent string in the line item being a new user agent ("Yes"-branch from the decision block 512), e.g., L.User_Agent not in S.User_Agent_Set, the node further determines whether the number of user agents in the user agent set of the session record has exceeded the maximum number of user agents, e.g., whether size_of (S.User_Agent_Set)<=MAX_USER_AGENTS, as represented by block 514. In some embodiments, in the case of the number of user agents in the user agent set of the session record not exceeding the maximum number of user agents ("No"-branch from the decision block 514), the node adds the user agent string from the line item to the user agent set field of the session record, as represented by block 516. On the other hand, in the case of the number of user agents in the user agent set of the session record exceeding the maximum number of user agents ("Yes"-branch from the decision block 514), the node increments the User_Agent_Exceeded counter, as represented by block 518.

Figures 5C, 5D:
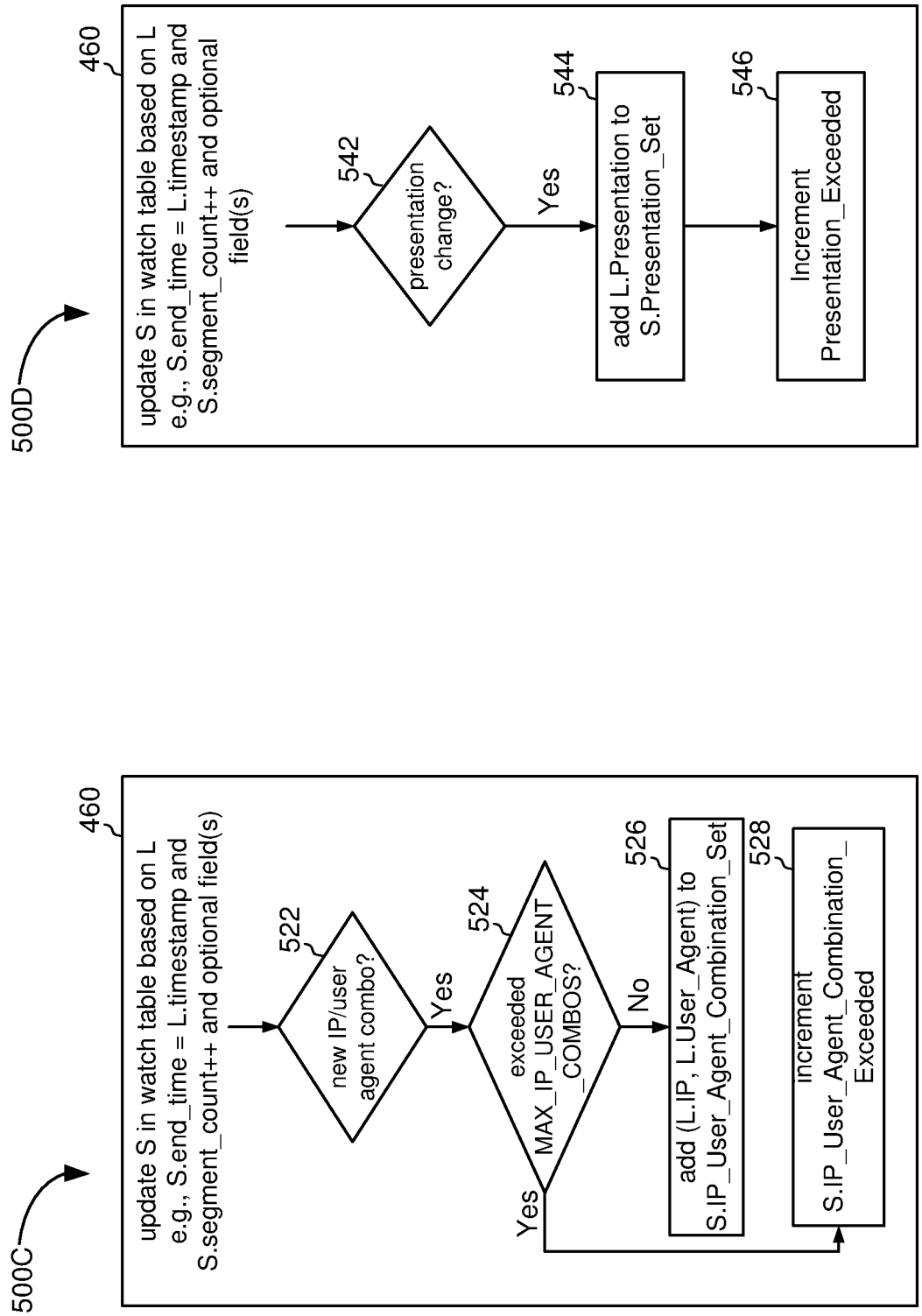

In FIG. 5C, a session record update begins with the node determining whether the combination of the IP address and the user agent string in the line item is a new IP address and user agent combination, e.g., by determining whether the IP address and the user agent in the line item are in the IP address and user agent combination set of the existing session record, as represented by block 522. In some embodiments, in the case of the IP address and user agent combination in the line item being a new IP address and user agent combination ("Yes"-branch from the decision block 512), e.g., (L.IP, L.User_Agent) not in S.IP_User_Agent_Combination_Set, the node further determines whether the number of IP and user agent combinations in the IP user agent combination set of the session record has exceeded the maximum number of combinations, e.g., whether size_of (S.IP_User_Agent_Combination_Set) <=MAX_IP_USER_AGENT_COMBOS, as represented by block 524. In some embodiments, in the case of the number of IP user agent combinations in the session record not exceeding the maximum number of IP user agent combinations ("No"-branch from the decision block 524), the node adds the combination of the IP address and the user agent string from the line item to the IP and user agent combination set of the session record, as represented by block 526. On the other hand, in the case of the number of IP and user agent combinations in the combination set exceeding the maximum number of combinations ("Yes"-branch from the decision block 524), the node increments the IP_User_Agent_Combination_Exceeded counter, as represented by block 528.

In FIG. 5D, a session record update begins with the node determining whether there is a presentation change based on the line item and the presentation value(s) in the presentation set of the session record, e.g., by determining whether L.presentation is in S. Presentation_Set, as represented by block 542. In some embodiments, in the case of detecting a presentation change ("Yes"-branch from the decision block 542), e.g., L.presentation not in S. Presentation_Set, the node adds the presentation value from the line item to the presentation set in the session record, e.g., add L.Presentation to S.Presentation_Set, as represented by block 544. Further, in some embodiments, as represented by block 546, the node increments the Presentation_Exceeded counter.

Figure 6:
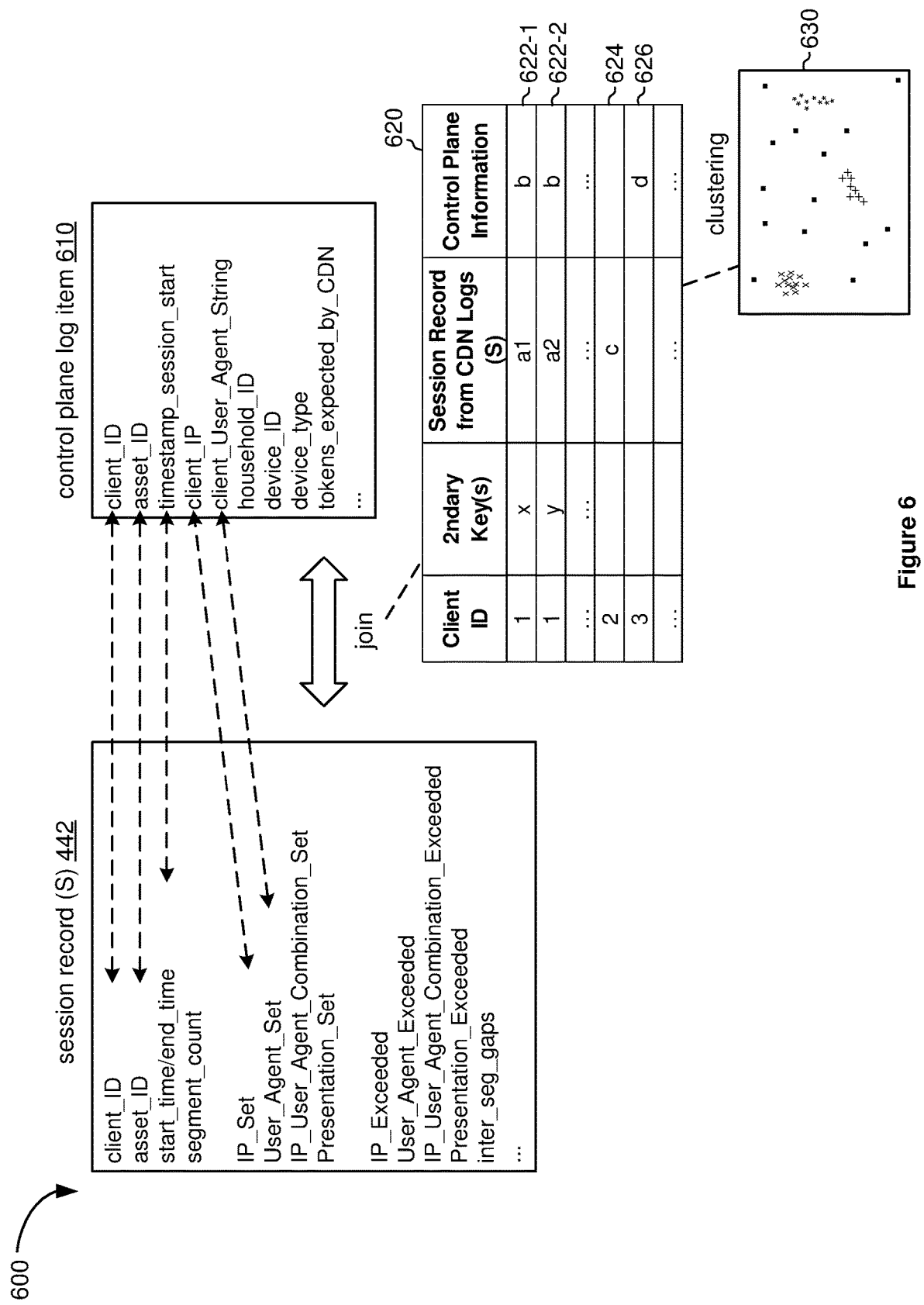
FIG. 6 is a diagram illustrating watch table enrichment and clustering for piracy detection, in accordance with some embodiments.

FIG. 6 is a diagram 600 illustrating watch table enrichment and clustering for detection analytics, in accordance with some embodiments. In some embodiments, the watch table enrichment shown in FIG. 6 is performed by the piracy detector 105 (FIG. 1), and in particular, performed by the watch table enrichment module 205 (FIG. 2), the control plane format translator 207 (FIG. 2), the enrichment extraction module 208 (FIG. 2), the detection analytics module 209, and/or the suspected piracy export module 210 (FIG. 2). In some embodiments, after the control plane log format translator 207 translates the control plane logs to a common format and the enrichment extraction module 208 (FIG. 2) extracts fields from the formatted control plane logs. An exemplary control plane item 610 including the extracted fields is shown in FIG. 6.

In some embodiments, the extracted fields in the control plane log item 610 include the client IP (denoted as client_IP) as detected in the request from the client, client user agent string (denoted as client_User_Agent_String) as detected in the request from the client, the timestamp for the session start (denoted as timestamp_session_start), the household ID, the device ID, the device type, information expected in the requests to the CDN (e.g., tokens, denoted as tokens_expected_by_CDN), along with client ID and asset ID (e.g., which channel), etc. In some embodiments, the watch table enrichment module joins the control plane log item 610 with the session record 442 and stores the results in the watch table. As indicated by the dashed arrows, the fields such as the client_ID, asset_ID, timestamp_session_start, client_IP, and/or client_User_Agent_String, etc., allow joining even when no matching fields are in either the session record 442 or the control plane log item 610. An exemplary enriched watch table 620 shows the result of joining the session record 442 and the control plane log item 610 using the client ID as the primary indexing key and other field(s) that can be used as part of the composite distribution key as secondary indexing key(s), e.g., asset ID, client IP, and/or user agent string, start time, end time, etc.

In the exemplary enriched watch table 620, a row 622-1 with client ID value 1 includes the information from both the session record 442 and the control plane log item 610, indicating the client with client_ID value 1 requested authorization from the CDN logs and requested authentication from the control plane. Further, a row 622-2 has the same client ID value 1 as the row 622-1, but has a different secondary key value, indicating multiple watch sessions are associated with the client with the client_ID value 1. Another row 624 with client_ID value 2 includes the information from the session record but not from the control plane logs, indicating the client with client_ID value has missing control plane information. In yet another example, a row 626 with client_ID value 3 includes the information from the control plane logs, but no matching session record from the CDN logs, indicating a possible new client with client_ID value 3.

Relative to the raw data from the CDNs and the control plane, the enriched watch table 620 reduces the amount of information for piracy identification by several orders of magnitude. As such, piracy detection according to the methods described herein is efficient and can be performed in real-time. Further, the enriched watch table 620 is not limited to being indexed using the client_ID, other secondary distribution keys, such as asset_ID, timestamp_session_start, client_IP, and/or client_User_Agent_String, can be used to allow querying with different index terms and joining the data from the control plane logs using different indexes. As such, the join can leave gaps where no matching join is available (e.g., as shown in the rows 624 and 626), and analyzing the gaps allows the piracy detector to identify anomalies and distinct attack patterns.

In some embodiments, the anomalies and distinct attack patterns are identified by the detection analytics module using clustering techniques, e.g., density based spatial clustering of applications with noise (DBSCAN). In some embodiments, as shown in FIG. 6, the aggregated enriched watch session table 620 is used by the detection analytics module for generating the clusters 630. Automated behaviors, e.g., the ones often exhibited by an attacker, are statistically differentiable from human usage, which is typically most of the usages in the system. Applying clustering techniques, the detection analytics module examines multiple features to identify the automated behaviors.

For example, when a pirate clones identity and/or shares tokens, the pirate often automates the process by sending out an abnormally high number of access requests per time unit for a given watch session. Further, the pirate may use multiple devices to access the content. As a result, an abnormally high number of distinct IP counts in a watch session may be associated with identity cloning and/or token sharing. Additionally, using the same identity and/or token, identity cloning and/or token sharing may also be associated with an abnormally high number of concurrent watch sessions of the same client ID. Based traits associated with identity cloning and/or token sharing, the detection analytics module can generate clusters 630 and analyze features reflecting automated behaviors.

In particular, a high segment_count reflects an abnormally high number of access requests per time unit for a given watch session and a high IP_Exceeded count reflects an abnormally high number of distinct IP counts in the same watch session. In another example, a high User_Agent_Exceeded count identifies an abnormally high number of distinct user agent counts in a watch session associated with the same client ID, and a high IP_User_Agent_Combination_Exceeded count identifies an abnormally high number of distinct IP and user agent combination counts in a watch session of the same client ID. In yet another example, a high Presentation_Exceeded count represents an abnormally high number of presentation changes in a watch session of the same client_ID, the number of records in the watch table with the same client ID signals an abnormally high number of concurrent watch sessions of the same client_ID, and a high inter_seg_gaps count represents an abnormally high number of inter segment gaps in watch session of the same client_ID. The detection analytics module identifies the cluster(s) with one or more abnormally high counts as exhibiting abnormal automated behaviors and generates reports for the suspected piracy export module to pass to the anti-piracy controller.

In some embodiments, the detection analytics module dynamically calibrates or tunes the various thresholds for determining abnormal activities in the piracy detection system, e.g., setting and/or adjusting the IP_Exceeded count threshold, the User_Agent_Exceeded count threshold, the IP_User_Agent_Exceeded count threshold, the IP_User_Agent_Combination_Exceeded count threshold, the Presentation_Exceeded count threshold, and/or inter_seg_gaps count threshold, etc. For example, a high IP_Exceeded count may be acceptable in certain regions and/or networks. For such regions and/or networks, an IP_Exceeded threshold may be increased to reduce the number of false positives, e.g., a reasonably high value of IP_Exceeded is determined to be acceptable because the value is still less than the IP_Exceeded threshold.

Previously, naïve examination checks a single abnormal condition. In contrast, the detection analytics module analyzes multiple features, thus can identify multiple types of piracy. Further, the detection analytics module can analyze multiple dimensions concurrently to detect piracy that intentionally avoids triggering threshold protections for a single dimension. For example, when framing an innocent user, one user's token can be illegally retrieved from unsecured communication channels or the client device the user uses. The pirate then shares the stolen token with another user to frame the legitimate user as participating in illegal content retrieval. When having a token-granting process that is easy to compromise, an attacker may generate their own tokens and illegally retrieve content as a fictitious user. Some systems use naïve token usage counting to enforce a maximum number of uses per token, where the maximum number is computed to allow clients some extra token reuse as a safety margin. An attacker can utilize the token to the maximum allowed number of uses to exploit the safety margins. In yet another example, a pirate can clone tokens from multiple devices and use each device to the concurrent usage threshold the naïve systems employ. Previously existing single dimension examination in the naïve counting systems would not be able to detect such concerted attacks.

In contrast, based on multiple traits, e.g., user agents, presentations, IP addresses, the detection analytics module uses multi-dimensional analysis that takes into account the dimensions represented by such traits to detect more types of attacks than previously existing piracy detection methods and systems. In particular, the detection analytics module can cluster the enriched watch session records without control plane information (e.g., missing household ID) and identify such cluster(s) as having abnormal behaviors of framing an innocent user. Further, the detection analytics module can cluster clients that sometimes appear to exhibit normal watch session behaviors and sometimes exhibit behaviors matching any of the other attacks, and identify such clients as having abnormal behaviors associated with a fictitious user. Additionally, the detection analytics module can observe a set of clients with the number of watch sessions that matches the known threshold of the token counting system and/or with an abnormally high number of access requests per watch session and synchronized in terms of their start time across a period of time. Such abnormal behaviors can be associated with exploiting naïve token usage counting.

Some previously existing anti-piracy methods and systems attempted to protect the content by strengthening the token protection, such as tying the token to the client IP and/or user agent. However, such methods and systems often cannot differentiate normal behaviors by legitimate users from abnormal behaviors by pirates. As such, the reports are often inaccurate in such systems. As a result, false positives caused by the client IP changes due to legitimate users changing its network access method and/or network connection cause disruptions to normal usages, whereas false negatives allow malicious clients using the same IP address (e.g., in a private network that performs network address translation (NAT)) to obtain content without being detected. Further, such methods and systems cannot prevent identity cloning and/or token sharing because a malicious user cloning a token can clone any other information passed in the request from the client to the server, including the identity. The malicious user can then use the identity and/or token not only for identity cloning and/or token sharing but also for framing an innocent user and/or obtaining content as a fictitious user.

Some other previously existing anti-piracy methods and systems attempted to limiting the token validity period to tackle exploiting naïve token usage counting. However, in such systems, renewing the token involves re-authentication of the user, and frequent re-authentication is inconvenient to users. Further, a token renewal request is often generated when an existing token is still valid, e.g., by sending the token while it is still valid along with the renewal request. An attacker can use a stolen and/or shared valid token to obtain a new token following the same flow when the existing valid token is expiring soon. To tackle the token renewal issue, some previously existing anti-piracy solutions apply token counting processes, where each granted token can be used multiple times up to a threshold limit. However, such solutions allow a sufficiently large threshold limit (e.g., leaving a safety margin) to allow for any normal (but possibly unusual) usage patterns without requiring the clients to go through the frequent re-authentication. Attackers can exploit large safety margins (e.g., allowing thousands of concurrent watch sessions, etc.) and one single legitimate subscription can yield thousands of illegitimate watch sessions.

In contrast, the piracy detection described herein in accordance with some embodiments, analyzes the abnormal behaviors without relying on specific authorization techniques (e.g., tokens) or particular identifiers (e.g., IP address and/or user agent string). As such, when the client IP addresses and/or user agent information change during normal usages, there is no service disruption for legitimate users, and the piracy detector does not rely on frequent re-authentication of legitimate users by the control plane to tackle exploiting naïve token usage counting. Thus, without frequent re-authentication and with less service disruption, the user experience for legitimate users has improved. On the other hand, when a malicious user shares the same IP address, uses a shared token, clones an identity, attempts to frame an innocent user, using an identity tied to a fictitious user, and/or exploits the safety margin, the piracy detection system can establish clustering to differentiate the automated behaviors from normal usages, thus improving the accuracy and efficacy of piracy detection.

Figure 7:
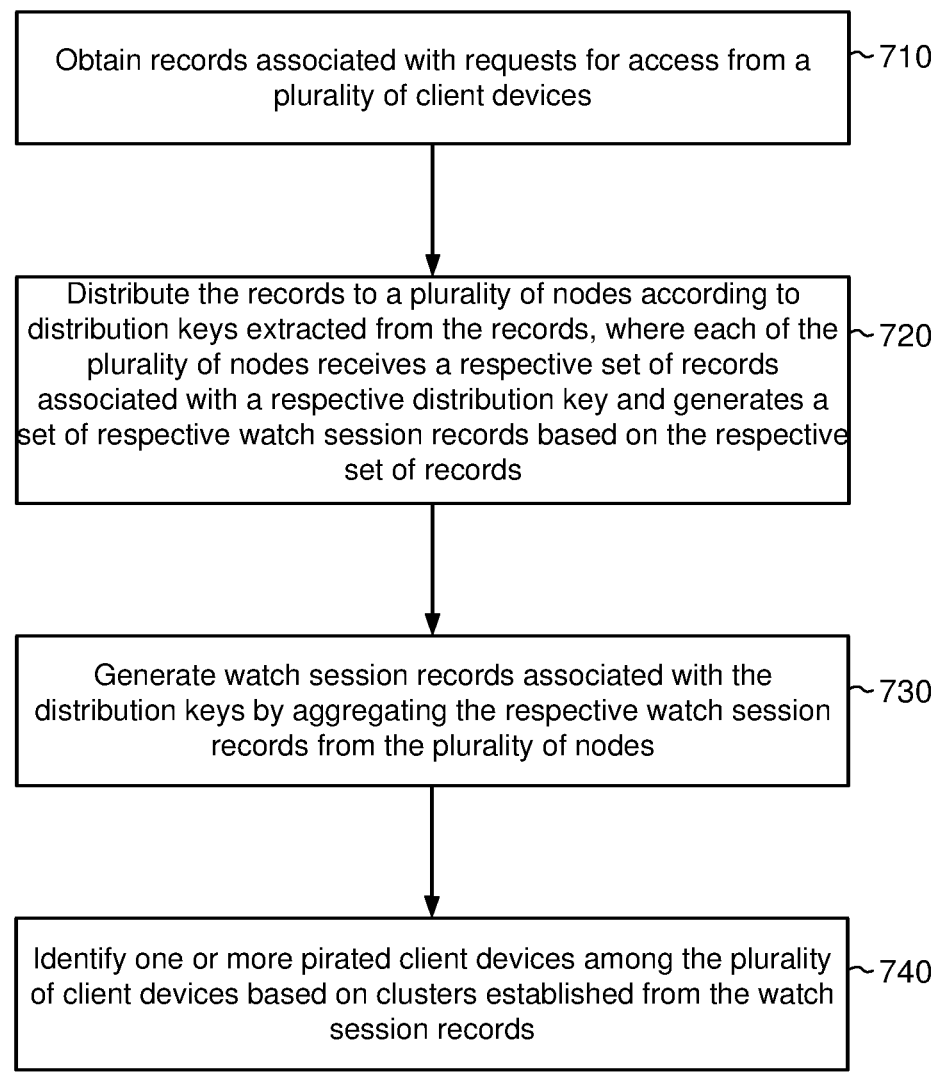
FIG. 7 is a flowchart illustrating a piracy detection method, in accordance with some embodiments.

FIG. 7 is a flowchart illustrating a piracy detection method 700 in accordance with some embodiments. In some embodiments, the piracy detection method 700 is performed at a device, which includes one or more processors and a non-transitory memory. In some embodiments, the device performs the function of the piracy detector 105 (FIG. 1) in the cloud platform 250 (FIG. 2). Briefly, the piracy detection method 700 includes obtaining records associated with requests for access from a plurality of client devices; distributing the records to a plurality of nodes according to distribution keys extracted from the records, wherein each of the plurality of nodes receives a respective set of records associated with a respective distribution key and generates a set of respective watch session records based on the respective set of records; generating watch session records associated with the distribution keys by aggregating the respective watch session records from the plurality of nodes; and identifying one or more pirated client devices among the plurality of client devices based on clusters established from the watch session records.

To that end, as represented by block 710 in FIG. 7, the method 700 begins with the piracy detector obtaining records associated with requests for access from a plurality of client devices. For example, as shown in FIGS. 1 and 2, the piracy detector 105 periodically obtains CDN logs from the CDNs 104 servicing the plurality of client devices 102 as shown in FIG. 1. As shown in FIG. 2, the CDN log format translator 202 of the piracy detector then constructs log records by extracting and/or directly copying fields from each log record, e.g., the timestamp, client IP, client user agent string, etc., and deriving from some fields, such as deriving from the request URL linear or VOD, the channel or asset ID, the token ID, file type, and/or presentation, etc. Further, in some embodiments, as shown in FIG. 2, the filtering module 203 of the piracy detector 105 filters the log records to generate the records based on a set of criteria, e.g., passing only log records for successful GET requests for video segments, of linear video, of channels 12, 13, 27, for all user agents except "XXYYZZ", etc.

The method 700 continues with watch table generator 204 (FIG. 2) of the piracy detector distributing the records to a plurality of nodes according to distribution keys extracted from the records, as represented by block 720. In some embodiments, as further represented by block 720, each of the plurality of nodes receives a respective set of records associated with a respective distribution key and generates a set of respective watch session records based on the respective set of records. For example, the respective distribution key can be an identifier associated with a respective client device such as a client ID or a combination of an IP address and a user agent string. In some embodiments, the asset ID is optionally added to the distribution key. Using the distribution key, as shown in FIG. 3, the watch table generator 204 distributes tasks in step 302 to the plurality of nodes 310. In FIG. 3, each node 310 is sized so that that the computation can take place in memory, e.g., the process including steps 304-306 of generating the set of respective watch session records upon receiving the respective set of records associated with the respective distribution key is performed in the respective memory.

In some embodiments, the plurality of nodes 310 as shown in FIG. 3 is a set of distributed map-reduce nodes, such that the watch table generator instructs each of the plurality of nodes 310 to generate a respective set of sorted records based on the respective set of records according to timestamps (e.g., in ascending order from the oldest to the newest), as shown in step 304 (FIG. 3). Further, as shown in step 305, the watch table generator instructs each of the plurality of nodes 310 to generate respective candidate watch session records based on the respective set of sorted records. In such embodiments, as shown in step 306, the session records, which are stored in the watch table, are then updated in accordance with the respective candidate watch session records from the plurality of nodes. Further in such embodiments, for a respective line item in the respective set of sorted records, as shown in FIG. 4, each node determines whether or not a session record corresponding to the respective line item exists in the watch session records based on the respective distribution key in the respective line item (e.g., seeking S in watch_table with client_ID=L.client_ID, asset_ID=L.asset_ID), as represented by blocks 420 and 430. As shown in step 440 (FIG. 4), each node creates the session record in the watch session records in accordance with a determination that the session record corresponding to the line item does not exist in the watch session records, including initializing counters (e.g., segment_count, IP_exceeded, User_Agent_Exceeded, IP_User_Agent_Combination_Exceeded, Presentation_Exceeded, and/or inter_seg_gaps, etc.) and setting fields in the session records according to corresponding fields in the respective line item. Further as shown following the "Yes"-branch from the decision block 450 in FIG. 4, in some embodiments, the node creates the session record and sets the fields when the gap between line item timestamp and the end time in the session record is bigger than a threshold, e.g., L.timestamp−S.end_time>WATCH_END_TIME_GAP.

Still referring to FIG. 7, the method 700 continues with the watch table generator of the piracy detector generating watch session records associated with the distribution keys by aggregating the respective watch session records from the plurality of nodes, as represented by block 730. For example, in FIG. 3, the respective watch session records from the plurality of nodes 310 are aggregated so that the watch table includes the watch session records associated with different distribution keys from the plurality of nodes 310. In some embodiments, the piracy detector 105 (e.g., with the control plane log format translator 207 in FIG. 2) obtains control plane logs from the control plane 103 as shown in FIG. 1. The control plane log format translator 207 in FIG. 2 translates the control plane logs to common formats so that the enrichment extraction module 208 can extract authentication data and expected authorization data from the control plane logs (e.g., extracting the control plane log item 610 in FIG. 6) and the watch table enrichment module 205 (FIG. 2) can update the watch session records by joining the watch session records with the authentication data and the expected authorization data, e.g., joining the session record 442 and the control plane log item 610 as shown in FIG. 6.

Referring back to FIG. 7, the method 700 continues with the detection analytics module 209 (FIG. 2) identifying one or more pirated client devices among the plurality of client devices based on clusters established from the watch session records. In some embodiments, the detection analytics module 209 (FIG. 2) identifies the one or more pirated client devices by establishing the clusters from the watch session records (e.g., generating the clusters 630 based on the data in the watch table 620 as shown in FIG. 6). Further, the detection analytics module 209 (FIG. 2) identifies the one or more pirated client devices by identifying one or more of the clusters as having features that satisfy at least one predetermined criterion and determining that the one or more pirated client devices are associated with the one or more of the clusters. In such embodiments, the detection analytics modules 209 (FIG. 2) further calibrates or tunes the at least one predetermined criterion based on context in accordance with some embodiments, e.g., setting or adjusting IP_Exceeded count threshold, the User_Agent_Exceeded count threshold, the IP_User_Agent_Exceeded count threshold, the IP_User_Agent_Combination_Exceeded count threshold, the Presentation_Exceeded count threshold, and/or inter_seg_gaps count threshold, etc. based on geographical data, network configurations, false positive/negative rates, etc.

In some embodiments, the method 700 further includes exporting a report identifying the one or more pirated client devices in real-time, e.g., exporting a piracy report by the suspected piracy export module 210 in FIG. 2, and causing disruption of access from the one or more pirated client devices based on the report, e.g., the anti-piracy controller 106 takes anti-piracy actions against the pirate 101-N based on the detection results from the piracy detector 105 as shown in FIG. 1. In some embodiments, when anti-piracy controller 106 applies the anti-piracy actions to all CDN nodes, e.g., CDNs 104 in FIG. 1. As such, despite the network connection of the client device, e.g., the pirate changing to another node at some point, and regardless of the number of client devices the pirate uses for concurrent attacks, the piracy actions can be detected and stopped.

For example, in FIG. 6, one predetermined criterion may specify that clients associated with session records with missing control plane information are suspected of using fictitious user IDs. Based on such a criterion, in the example shown in FIG. 6, the detection analytics module may include the client with client ID value 2 in the row 624 in the suspected piracy report. In another example, one predetermined criterion may specify that clients associated with sessions with an abnormally high number of concurrent watch sessions of the same client ID are suspected of identity cloning and/or token sharing. Based on such criterion, in the example shown in FIG. 6, in the case of thousands of rows are associated with client ID value 1, the detection analytics module may include the client with client ID value 1 from the rows 622-1, 622-2, etc. in the suspected piracy report.

Figure 8:
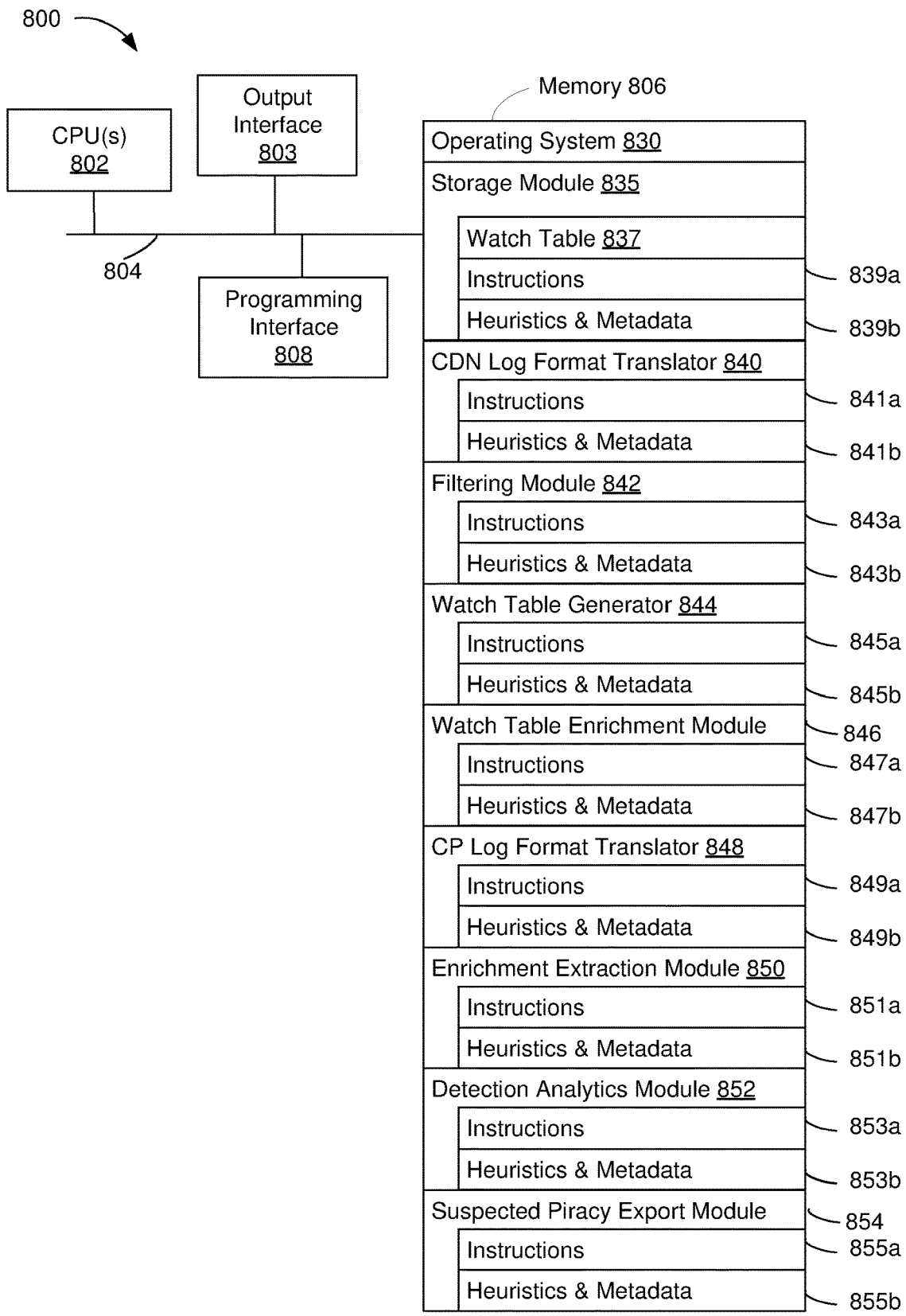
FIG. 8 is a block diagram of a computing device for over-the-top piracy detection, in accordance with some embodiments.

FIG. 8 is a block diagram of a computing device 800 for piracy detection in accordance with some embodiments. In some embodiments, the computing device 800 corresponds to the piracy detector 105 in FIG. 1 and performs one or more of the piracy detection functionalities described above with reference to FIG. 2. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPUs) 802 (e.g., processors), one or more output interfaces 803 (e.g., a network interface), a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a storage module 835, a CDN log format translator 840, a filtering module 842, a watch table generator 844, a watch table enrichment module 846, a control plane log format translator 848, an enrichment extraction module 850, a detection analytics module 852, and a suspected piracy export module 854. In some embodiments, one or more instructions are included in a combination of logic and non-transitory memory. The operating system 830 includes procedures for handling various basic system services and for performing hardware dependent tasks.

In some embodiments, the storage module 835 is configured to store and/or manage a watch table 837 (e.g., the watch table 110 in FIG. 1). To that end, the storage module 835 includes a set of instructions 839a and heuristics and metadata 839b.

In some embodiments, the CDN log format translator 840 (e.g., the CDN log format translator 202, FIG. 2) is configured to translate CDN logs to common formats. To that end, the CDN log format translator 840 includes a set of instructions 841a and heuristics and metadata 841b.

In some embodiments, the filtering module 842 (e.g., the filtering module 203, FIG. 2) is configured to apply one or more filters to the formatted CDN logs from the CDN log format translator 840. To that end, the filtering module 842 includes a set of instructions 843a and heuristics and metadata 843b.

In some embodiments, the watch table generator 844 (e.g., the watch table generator 204, FIG. 2) is configured to generate session records stored in the watch table 837 as described above with reference to FIGS. 3-4 and 5A-5D. In some embodiments, the watch table generator 844 includes a plurality of nodes (e.g., the nodes 310 in FIG. 3) to create and/or update the data in the watch table in parallel as described above with reference to FIG. 3. To that end, the watch table generator 844 includes a set of instructions 845a and heuristics and metadata 845b.

In some embodiments, the watch table enrichment module 846 (e.g., the watch table enrichment module 205, FIG. 2) is configured to enrich the watch table 837 with control plane information as described above with reference to FIG. 6. To that end, the watch table enrichment module 846 includes a set of instructions 847a and heuristics and metadata 847b.

In some embodiments, the control plane log format translator 848 (e.g., the control plane log format translator 207, FIG. 2) is configured to translate control plane logs to common formats. To that end, the control plane log format translator 848 includes a set of instructions 849a and heuristics and metadata 849b.

In some embodiments, the enrichment extraction module 850 (e.g., the enrichment extraction module 208, FIG. 2) is configured to extract control plane log records from formatted control plane logs provided by the control plane log format translator 848 and provides the extracted control plane log records to the watch table enrichment module 846. To that end, the enrichment extraction module 850 includes a set of instructions 851a and heuristics and metadata 851b.

In some embodiments, the detection analytics module 852 (e.g., the detection analytics module 209, FIG. 2) is configured to analyze the watch table 837 for piracy detection. To that end, the detection analytics module 852 includes a set of instructions 853a and heuristics and metadata 853b.

In some embodiments, the suspected piracy export module 854 (e.g., the suspected piracy export module 210, FIG. 2) is configured to export the piracy detection results from the detection analytics module 852 to the anti-piracy controller 106 (FIG. 1). To that end, the suspected piracy export module 854 includes a set of instructions 855a and heuristics and metadata 855b.

Although the storage module 835, the CDN log format translator 840, the filtering module 842, the watch table generator 844, the watch table enrichment module 846, the control plane log format translator 848, the enrichment extraction module 850, the detection analytics module 852, and the suspected piracy export module 854 are illustrated as residing on a single computing device 800, it should be understood that in other embodiments, any combination of the storage module 835, the CDN log format translator 840, the filtering module 842, the watch table generator 844, the watch table enrichment module 846, the control plane log format translator 848, the enrichment extraction module 850, the detection analytics module 852, and the suspected piracy export module 854 can reside in separate computing devices in various embodiments. For example, in some embodiments, each of the storage module 835, the CDN log format translator 840, the filtering module 842, the watch table generator 844, the watch table enrichment module 846, the control plane log format translator 848, the enrichment extraction module 850, the detection analytics module 852, and the suspected piracy export module 854 resides on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method for detecting over-the-top (OTT) piracy comprising:
   at a device including one or more processors and a non-transitory memory:
   obtaining filtered log records associated with requests for access from a plurality of client devices, wherein the filtered log records are derived and transformed from logs obtained from one or more content distribution networks (CDNs) servicing the plurality of client devices;
   distributing the filtered log records to a plurality of nodes according to distribution keys extracted from the filtered log records, wherein each of the plurality of nodes receives a respective set of filtered log records associated with a respective distribution key and generates respective watch session records based on the respective set of filtered log records;
   in response to generating the set of respective watch session records, generating reduced watch session records associated with the extracted distribution keys by aggregating the respective watch session records generated by the plurality of nodes and establishing clusters from the reduced watch session records; and
   identifying piracy behaviors on one or more pirated client devices among the plurality of client devices serviced by the one or more CDNs based on the clusters established from the reduced watch session records.

2. The method of claim 1, further comprising:
   obtaining the logs from the one or more CDNs servicing the plurality of client devices;
   constructing log records by extracting and deriving from fields in the logs; and
   filtering the log records to generate the filtered log records based on a set of criteria.

3. The method of claim 1, wherein the respective distribution key of the extracted distribution keys includes an identifier associated with a respective client device.

4. The method of claim 1, wherein each of the plurality of nodes receives the respective set of filtered log records associated with a respective distribution key and generates the respective watch session records based on the respective set of filtered log records by:
   sizing a respective node of the plurality of nodes, including sizing respective memory of the respective node; and
   generating the respective watch session records in the respective memory upon receiving the respective set of filtered log records associated with the respective distribution key.

5. The method of claim 1, wherein:
   the plurality of nodes is a set of distributed map-reduce nodes; and
   the method further includes instructing each of the plurality of nodes to, in parallel, generate a respective set of sorted records based on the respective set of filtered log records according to timestamps and generate respective candidate watch session records based on the respective set of sorted records.

6. The method of claim 5, wherein generating the reduced watch session records associated with the extracted distribution keys includes:
   storing the reduced watch session records in a table; and
   updating the reduced watch session records in the table in accordance with the respective candidate watch session records from the plurality of nodes.

7. The method of claim 5, wherein generating the respective candidate watch session records based on the respective set of sorted records includes:
   creating a session record of the reduced watch session records, including initializing counters and setting fields in the session record according to corresponding fields in a respective line item in the respective set of sorted records.

8. He method of claim 1, further comprising:
   obtaining control plane logs from a control plane;
   extracting authentication data and expected authorization data from the control plane logs; and
   updating the reduced watch session records by joining the reduced watch session records with the authentication data and the expected authorization data.

9. The method of claim 1, wherein identifying the piracy behaviors on the one or more pirated client devices among the plurality of client devices serviced by the one or more CDNs based on the clusters established from the reduced watch session records includes:
   identifying one or more of the clusters as having features that satisfy at least one predetermined criterion; and
   determining that the piracy behaviors on the one or more pirated client devices are associated with the one or more of the clusters.

10. The method of claim 9, further comprising:
    calibrating the at least one predetermined criterion based on context.

11. The method of claim 1, further comprising:
    exporting a report identifying the one or more pirated client devices in real-time; and
    causing disruption of access from the one or more pirated client devices based on the report.

12. A device for detecting over-the-top (OTT) piracy comprising:
    one or more hardware processors;
    a non-transitory memory; and
    one or more programs stored in the non-transitory memory, which, when executed by the one or more hardware processors, cause the device to:
    obtain filtered log records associated with requests for access from a plurality of client devices, wherein the filtered log records are derived and transformed from logs obtained from one or more content distribution networks (CDNs) servicing the plurality of client devices;

distribute the filtered log records to a plurality of nodes according to distribution keys extracted from the filtered log records, wherein each of the plurality of nodes receives a respective set of filtered log records associated with a respective distribution key and generates respective watch session records based on the respective set of filtered log records;

in response to generating the set of respective watch session records, generate reduced watch session records associated with the extracted distribution keys by aggregating the respective watch session records generated by the plurality of nodes and establish clusters from the reduced watch session records; and identify piracy behaviors on one or more pirated client devices among the plurality of client devices serviced by the one or more CDNs based on the clusters established from the reduced watch session records.

13. The device of claim 12, wherein the one or more programs further cause the device to:

obtain logs from the one or more CDNs servicing the plurality of client devices;

construct log records by extracting and deriving from fields in the logs; and filter the log records to generate the filtered log records based on a set of criteria.

14. The device of claim 12, wherein the respective distribution key of the extracted distribution keys includes an identifier associated with a respective client device.

15. The device of claim 12, wherein each of the plurality of nodes receives the respective set of filtered log records associated with a respective distribution key and generates the respective watch session records based on the respective set of filtered log records by:

sizing a respective node of the plurality of nodes, including sizing respective memory of the respective node; and generating the respective watch session records in the respective memory upon receiving the respective set of filtered log records associated with the respective distribution key.

16. The device of claim 12, wherein:

the plurality of nodes is a set of distributed map-reduce nodes; and the one or more programs further cause the device to instruct each of the plurality of nodes to, in parallel, generate a respective set of sorted records based on the respective set of filtered log records according to timestamps and generate respective candidate watch session records based on the respective set of sorted records.

17. The device of claim 16, wherein generating the reduced watch session records associated with the extracted distribution keys includes:

storing the reduced watch session records in a table; and updating the reduced watch session records in the table in accordance with the respective candidate watch session records from the plurality of nodes.

18. The device of claim 12, wherein the one or more programs further cause the device to:

obtain control plane logs from a control plane;

extract authentication data and expected authorization data from the control plane logs; and update the reduced watch session records by joining the reduced watch session records with the authentication data and the expected authorization data.

19. The device of claim 12, wherein identifying the piracy behaviors on the one or more pirated client devices among the plurality of client devices serviced by the one or more CDNs based on the clusters established from the reduced watch session records includes:

identifying one or more of the clusters as having features that satisfy at least one predetermined criterion; and determining that the piracy behaviors on the one or more pirated client devices are associated with the one or more of the clusters.

20. The device of claim 19, the one or more programs further cause the device to:

calibrate the at least one predetermined criterion based on context.

* * * * *